United States Patent [19]

Hottes et al.

[11] 4,167,984

[45] Sep. 18, 1979

[54] INTERLOCKING SAFETY HANDLE FOR A FRICTION DRIVE APPARATUS

[75] Inventors: Ronald W. Hottes, Torrance; James West, Rancho Palos Verdes, both of Calif.

[73] Assignee: McCulloch Corporation, Los Angeles, Calif.

[21] Appl. No.: 850,135

[22] Filed: Nov. 10, 1977

[51] Int. Cl.$^2$ ............................................. B62M 13/04
[52] U.S. Cl. .................................... 180/221; 180/294
[58] Field of Search ............ 180/33 D, 33 R, 64 MM, 180/31, 74

[56] References Cited

U.S. PATENT DOCUMENTS

| 688,838 | 12/1901 | Dorsey | 180/33 D |
| 2,578,886 | 12/1951 | Isherwood et al. | 180/33 D |

FOREIGN PATENT DOCUMENTS

| 232087 | 4/1925 | United Kingdom | 180/33 D |
| 254974 | 7/1926 | United Kingdom | 180/33 D |

Primary Examiner—Trygve M. Blix
Assistant Examiner—Terrance L. Siemens
Attorney, Agent, or Firm—Kenway & Jenney

[57] ABSTRACT

An apparatus for frictionally engaging and driving a rotatable wheel of a lightweight vehicle is disclosed. The apparatus has a pivotable handle which is movable between a first and a second position. In the first position the handle blocks access to a fuel tank while permitting operation of the engine and engagement of a driven friction surface with the rotatable wheel. In the second position of the handle, the engine is inoperable, the fuel tank may be refilled, and the friction surface cannot engage the rotatable wheel. Preferably, the handle provides means for pivoting the engine to and from a position in which the friction surface engages the rotatable wheel and for operationally engaging an electrical switch to control operation of the engine.

11 Claims, 2 Drawing Figures

INTERLOCKING SAFETY HANDLE FOR A FRICTION DRIVE APPARATUS

The invention relates generally to apparatus for driving light duty or light weight vehicles and in particular to apparatus for frictionally driving a lightweight vehicle.

BACKGROUND OF THE INVENTION

Friction drives have been known in many different applications for many years. In particular, it has often been proposed to provide a friction drive, using an internal combustion engine as the power source, for driving the front or rear wheel of a lightweight vehicle such as a bicycle. While these devices are well known, they have not always been constructed with both convenience and safety of operation in mind.

The principle objects of this invention are therefore to provide an apparatus for frictionally driving a light weight vehicle which is safe, reliable, and low cost, which is convenient to operate, which has a convenient means for engaging the drive with and releasing the drive from contact with the vehicle wheel, and which provides an interlock safety system to insure the safety of the vehicle and its operator, for example, while the engine fuel tank is being refilled.

SUMMARY OF THE INVENTION

The invention relates to an apparatus for frictionally engaging a rotatable wheel of a lightweight vehicle. The apparatus to which the invention relates comprises a drive motor having a rotating output shaft, a fuel tank for providing fuel to the motor, the tank having a closeable fuel receiving opening, and a driven wheel mounted for driven rotation by the output shaft of the motor, the driven wheel having a circular friction surface for frictionally engaging the rotatable wheel. The apparatus further comprises means for releasable engaging the driven wheel friction surface with the rotatable wheel. The invention features a pivotable handle coupled to the apparatus for selectively operating the motor. The handle is pivotable from a first position to a second position. In the first position, a protruding portion of the handle substantially blocks access to the fuel tank opening thereby preventing the tank from being filled. In the second position, the fuel tank opening can be accessed for supplying fuel to the tank. In addition, the motor is operable when the handle is in the first position; however, the motor is inoperable when the handle is in the second position.

In a first particular aspect of the invention, there is further featured an electrical switch in operable engagement with the handle, the handle in the first position setting the switch into a first state and the handle in the second position setting the switch into a second state, the switch being electrically connected to the motor and the motor being inoperable when the switch is in the second state. Preferably, the switch is in the second state whenever the handle is not in the first position.

In a second aspect of the invention, the releasable engaging means comprises means for pivotally mounting the driven wheel for engaging the rotatable wheel. In this aspect, the handle is connected to a top side of the apparatus. In addition, means are provided for mechanically coupling the handle to the wheel pivoting means for pivoting the driven wheel from a driving condition when the handle is in the first position to a disengaged condition when the handle is in the second position.

DESCRIPTION OF THE DRAWINGS

Other objects, features, and advantages of the invention will appear from the following description of the preferred embodiment of the invention taken together with the drawings in which.

DESCRIPTION OF A PREFERRED EMBODIMENT

Figure 1:
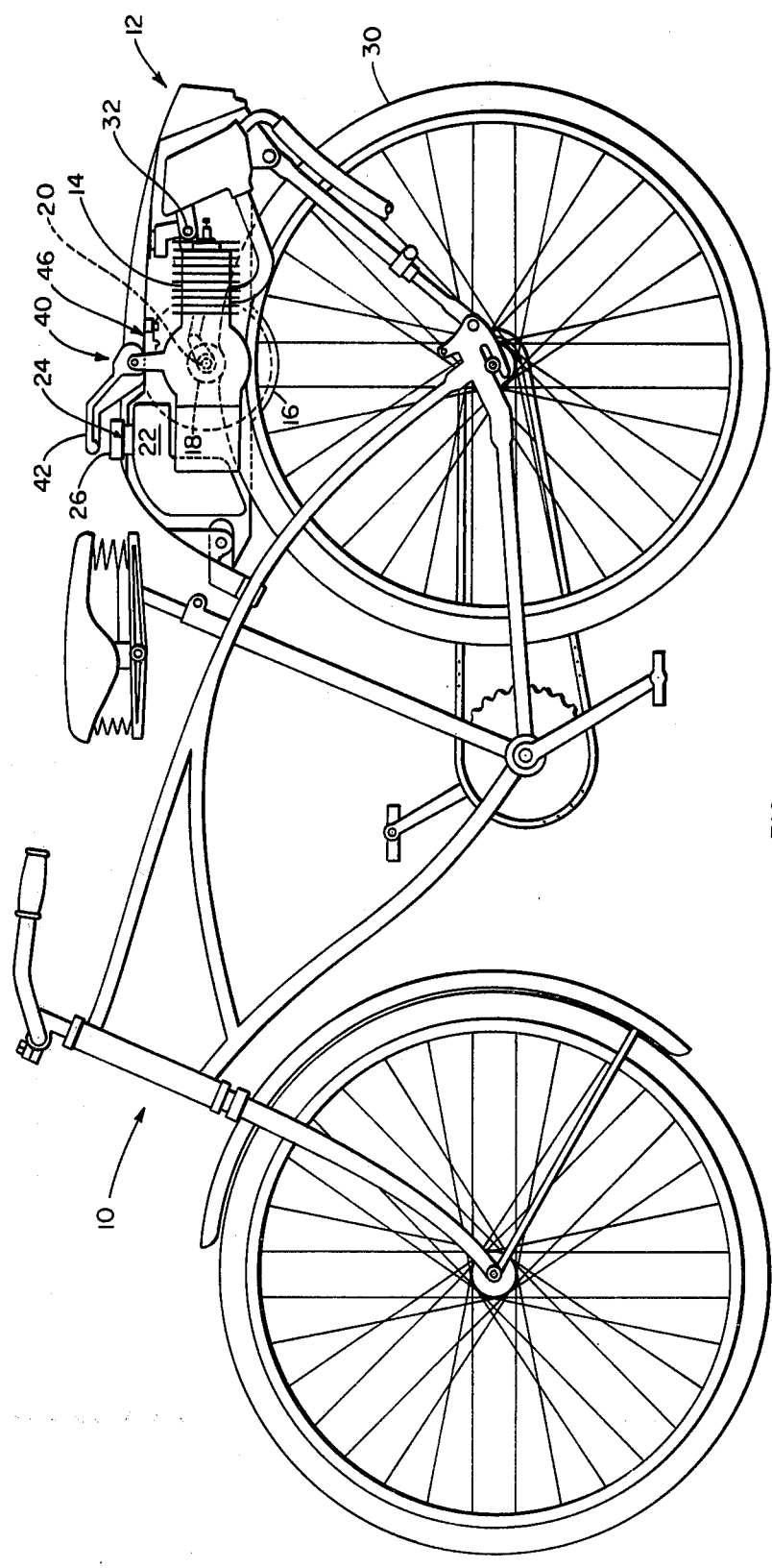
FIG. 1 is a schematic view, broken away, to show the major components of the friction drive apparatus.

Referring to FIG. 1, the invention is applicable to many different kinds of lightweight vehicles, and in the illustrated embodiment, a bicycle 10 of a standard design has secured, at a rear portion thereof, a friction driving apparatus 12 for providing drive power tending to urge the bicycle forward. The friction driving apparatus 12 comprises a drive motor 14, typically an air cooled, single cylinder internal combustion engine, a driven wheel 16 having a driving friction surface 18 and mounted for rotation by a rotating output shaft 20 of the engine. The friction driving apparatus 12 further comprises a fuel tank 22 connected for providing fuel to the internal combustion engine, the fuel tank having a closeable fuel receiving opening 24 securely closed by a fuel tank cap 26 which forms an air tight seal with the tank.

The driven wheel friction surface 18 engages and drives, in the illustrated embodiment, a rear rotatable bicycle wheel 30 at least to propel the vehicle in a forward direction. The apparatus 12 further comprises means for releasably engaging the driven wheel friction surface with the rear bicycle wheel. In the illustrated embodiment of the invention, the releasable engaging means comprises a structure which pivots the motor and its connected driven components, including the output shaft, the driven wheel, and if included, a clutch, etc., about a pivot axis 32 from an engaged position in which friction surface 18 is in driving contact with the bicycle wheel tire to a disengaged position wherein surface 18 is out of contact with the bicycle tire.

Figure 2:
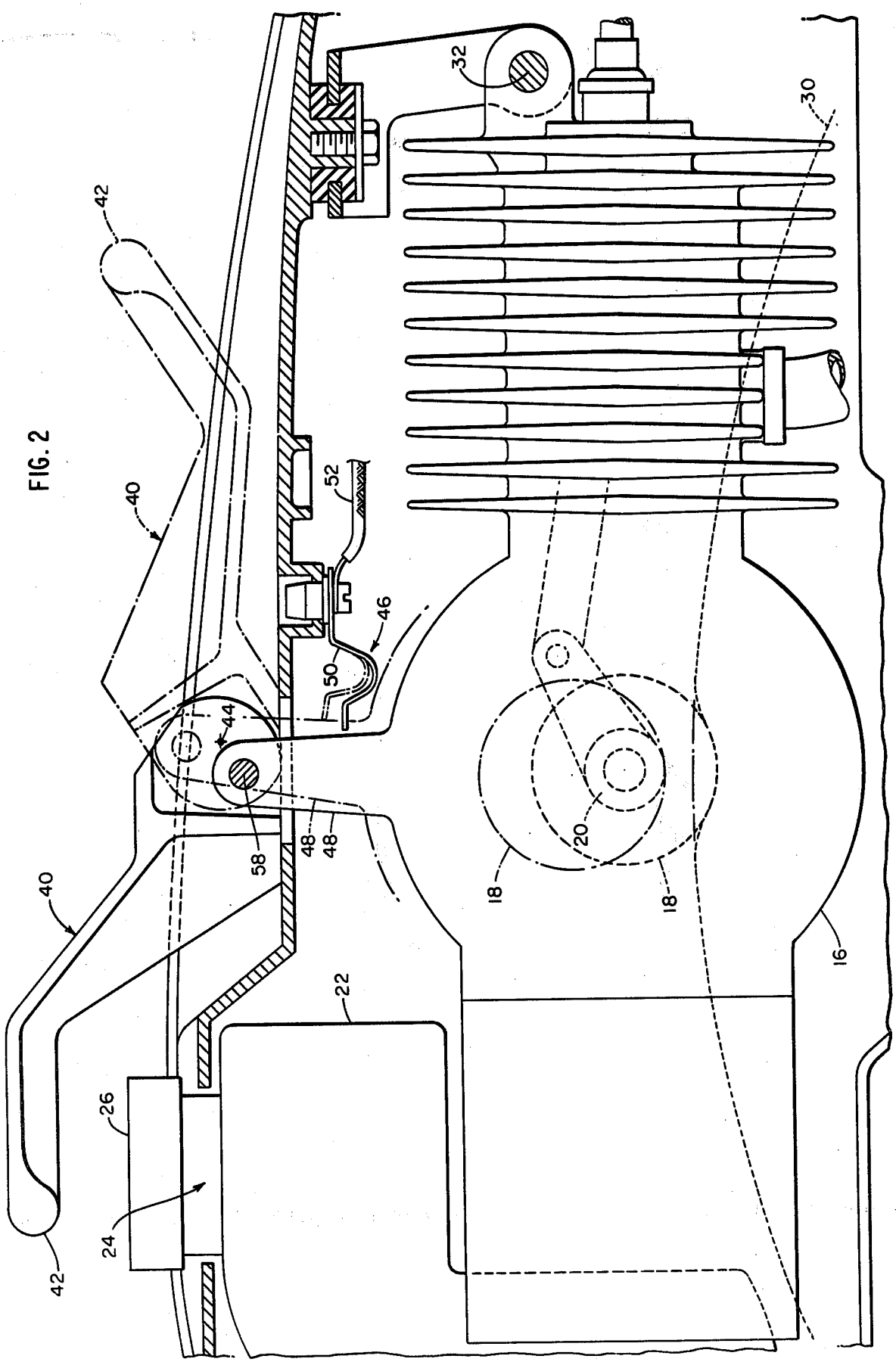
FIG. 2 is a more detailed cross-sectional view showing the handle in its two operating positions relative to the fuel tank, the driven wheel, and the associated switch means for controlling operation of the engine.

Referring in particular to FIG. 2, the apparatus 12 further comprises pivotable handle 40 having a protruding portion 42. Pivotable handle 40 is mounted for pivotal movement about a pivot axis 44 from a first position in which protruding portion 42 substantially blocks access to the fuel tank receiving opening 24 and fuel tank cap 26 to a second position (indicated by the position of handle 40 shown in dotted lines in FIG. 2) wherein the fuel tank receiving opening can be accessed. In the first handle position, therefore, access to the fuel tank opening is made sufficiently difficult to prevent the tank from being filled with fuel; and when the handle 40 is pivoted to the second position, access to the fuel tank opening is obtained and the engine may be refueled.

The pivotable handle is also connected, in the preferred embodiment, to operatively engage an electrical switch 46. In the illustrated embodiment, the electrical switch comprises an electrically conductive extension element 48, connected between the drive motor assembly and the handle 40, and an electrically conductive spring element 50 connected to the ignition system of drive motor through a wire 52. The switch operates as follows to provide a safety interlock system. Wire 52 is connected to the primary of the ignition coil (not shown) of the engine. When handle 40 is in the first position wherein protruding portion 42 substantially blocks access to fuel receiving opening 24, there is no connection between spring element 50 and extension element 48; and the switch 46 is in a first state in which the engine can be operated. However, when the handle is pivoted to the second position (indicated by the dotted lines in FIG. 2), extension element 48 is moved toward and engages spring element 50 to electrically ground wire 52. The switch is thus set to a second state in which the engine is inoperable because the primary of the ignition coil is grounded through grounding of wire 52. Preferably, the switch attains its second state whenever the handle is in a position wherein the fuel tank can be refueled. It should be obvious that many other configurations of switches and switch components can be used in combination with pivoting handle 40 to provide the just described interlock feature. In addition, the engine may be connected so that it is electrically inoperable in many other ways which will be obvious to one skilled in the art.

In the illustrated embodiment, extension element 48 serves a duel purpose. The illustrated element 48 is connected to a structurally fixed portion of the driven wheel mounting assembly and has a pivotal connection at pivot axis 58 to the handle 40. As a result, when the handle pivots from its first to its second position, extension element 48 is urged upward due to the offset of its connection at pivot axis 58 with respect to handle 40 pivot axis 44. Thus, the entire motor drive system is supportingly pivoted around pivot axis 32 and, as extension element 48 travels in the upward direction, the motor assembly pivots upward (clockwise in FIG. 2) around the supporting pivot connection axis 32. As a result, when the handle is pivoted to the second position wherein the fuel tank can be refilled, the driven wheel friction surface 18 is raised away from the rotatable wheel, thereby disengaging it from a driving contact with the vehicle wheel.

ADVANTAGES OF THE INVENTION

There is thus described a novel interlocking safety handle for a friction drive apparatus which advantageously maintains the apparatus drive motor in an inoperative state, an inoperative position, or both, whenever the fuel tank is being filled. In this aspect, apparatus according to the invention automatically prevents the possibly dangerous condition in which an internal combustion engine is refueled while the engine is running. Thus, the handle can operationally engage an electrical switch means, which is adjustable, so that the ignition system of the drive motor is grounded, short circuited, or otherwise rendered inoperable, at a selected position of the handle.

The handle is also conveniently located on top of the friction drive apparatus so that when the vehicle is a bicycle, it may be reached by the driver of the bicycle from a sitting position to pivot the motor drive assembly about its supporting pivot axis whereby the driven wheel friction surface is disengaged from the vehicle wheel. This convenience enables the bicycle operator to quickly disengage the drive wheel under unexpected or otherwise potentially dangerous conditions. Consequently, the friction drive apparatus according to the invention is both conveniently mounted and provides a safe and reliable drive means.

Other embodiments of the invention, including additions, subtractions, deletions, and modifications of the preferred disclosed embodiment, will be obvious to those skilled in the art and are within the scope of the following claims.

What is claimed is:

1. In an apparatus for frictionally engaging a rotatable wheel of a lightweight vehicle for driving said vehicle, said apparatus comprising
   a drive motor having a rotating output shaft,
   a fuel tank for providing fuel to said motor, said tank having a closeable fuel receiving opening,
   a driven wheel mounted for driven rotation by said output shaft, said driven wheel having a circular friction surface for frictionally engaging said rotatable wheel, and
   means for releasably engaging said driven wheel friction surface with said rotatable wheel,
   the improvement comprising
      a pivotable handle coupled to said apparatus for selectively operating said motor, said handle being pivotable from
         a first position wherein
            said motor is operable, and
            a protruding portion of the handle substantially blocks access to said fuel tank opening thereby preventing said tank from being filled,
         to a second position wherein
            said motor is inoperable, and
            said fuel tank opening can be accessed to fill the tank.

2. The apparatus of claim 1 wherein
   said releasably engaging means comprises a means for pivotably mounting said driven wheel for engaging said rotatable wheel,
   said handle is connected to a top side of said apparatus and
   further comprising means for mechanically coupling said handle to said pivoting means for pivoting said driven wheel from a driving condition when the handle is in the first position, to a disengaged condition when the handle is in the second position.

3. The apparatus of claim 2 wherein said improvement further comprises
   an electrical switch in operable engagement with said handle, said handle in said first position setting said switch into a first state and said handle in said second position setting said switch into a second state, said switch being electrically connected to said motor, and
   said motor being inoperable with the switch in said second state.

4. The apparatus of claim 2 wherein said means for mechanically coupling comprises
   an extension element mechanically connected between the handle and the motor and movable in response to the pivotal motion of the handle for pivoting the driven wheel away from engagement with said rotatable wheel when said handle pivots from its first position to its second position.

5. The apparatus of claim 2 wherein said rotatable wheel is a rear wheel of a bicycle, and said handle is mounted on said apparatus at a position substantially on a plane with and behind a bicycle seat of said bicycle.

6. The apparatus of claim 1 wherein said improvement further comprises
an electrical switch in operable engagement with said handle, said handle in said first position setting said switch into a first state and said handle in said second position setting said switch into a second state,
said switch being electrically connected to said motor, and
said motor being inoperable with the switch in said second state.

7. The apparatus of claim 6 wherein said switch is in said second state whenever said fuel tank opening can be accessed to fill said tank.

8. The apparatus of claim 6 where said switch comprises
an electrically conductive spring element connected to an electrical portion of the motor ignition system,
an extension element mechanically coupled at least to said handle, said extension element being connected to electrical ground,
means for positioning said spring and said extension elements whereby said spring elements are not in contact when the handle is in said first position and are in electrical contact when the handle is in said second position, and
said motor is inoperable when said spring element is electrically grounded.

9. In an apparatus for frictionally engaging a rotatable wheel of a lightweight vehicle for driving said vehicle, said apparatus comprising
a drive motor having a rotating output shaft,
a fuel tank for providing fuel to said motor, said tank having a closeable fuel receiving opening,
a driven wheel mounted in a driven wheel assembly for driven rotation by said output shaft, said driven wheel having a circular friction surface for frictionally engaging said rotatable wheel, and
means for releasably engaging said driven wheel friction surface with said rotatable wheel,
the improvement comprising
means for simultaneously
rendering said motor electrically inoperable and
pivoting said driven wheel to a position in which said driven wheel is out of engagement with said rotatable wheel,
said rendering and pivoting means further including an extension member mechanically fixed to said driven wheel assembly and making electrical contact with a spring member when said driven wheel is out of engagement with said rotatable wheel.

10. The apparatus of claim 9 wherein said means for simultaneously rendering and pivoting comprises
a pivotable handle mechanically coupled to said driven wheel for pivoting said drive wheel away from said rotatable wheel when said handle is pivoted to an engine stopped position, and
said handle, in said engine stopped position, being in actuating contact with a switch for electrically grounding said motor ignition.

11. In an apparatus for frictionally engaging and driving a rear wheel of a bicycle, the apparatus comprising
an internal conbustion engine having a rotating output shaft,
a fuel tank for providing fuel to said engine, said tank having a closeable fuel receiving opening,
a drive wheel mounted for driven rotation by said output shaft, said drive wheel having a circular friction surface for frictionally engaging and driving said bicycle wheel, and
means for releasably engaging said drive wheel friction surface with said bicycle rear wheel,
the improvement comprising
a pivotable handle coupled to said apparatus for selectively operating said engine, said handle being pivotable from
a first position wherein
a protruding portion thereof substantially prevents access to said fuel tank opening thereby blocking the supply of fuel to said tank,
said engine is operable, and
said drive wheel friction surface is engagable with said bicycle wheel,
to a second position wherein
said fuel tank opening can be accessed for filling said tank,
said engine is inoperable, and
said drive wheel friction surface cannot engage said bicycle wheel,
an electrical switch in operable engagement with said handle, said handle in said first position setting said switch into a first state, and said handle, in a position wherein said tank can be accessed for filling, setting said switch into a second state, the engine being inoperable with the switch in said second state,
said handle being mounted on said apparatus at a position substantially on a plane with and behind a bicycle seat of said bicycle, and
said means for releasably engaging said drive wheel with said rear wheel comprises
means for pivotally mounting said drive wheel on said bicycle for releasably engaging said bicycle rear wheel, and said handle being mechanically coupled to said pivot means for pivoting said drive wheel to a driving condition in contact with said bicycle wheel when the handle is in said first position, and to a disengaged position out of contact with said wheel when said handle is in said second position.

* * * * *